(12) United States Patent
Sugihara et al.

(10) Patent No.: US 6,340,041 B1
(45) Date of Patent: Jan. 22, 2002

(54) PNEUMATIC TIRE INCLUDING TWO WIDE CIRCUMFERENTIAL GROOVES

(75) Inventors: Hideaki Sugihara, Amagasaki; Koji Ohkita, Toyota, both of (JP)

(73) Assignee: Sumitomo Rubber Industries, Hyogo-ken (JP)

( * ) Notice: Subject to any disclaimer, the term of this patent is extended or adjusted under 35 U.S.C. 154(b) by 0 days.

(21) Appl. No.: 09/457,665

(22) Filed: Dec. 9, 1999

(51) Int. Cl.$^7$ ............... B60C 11/13; B60C 101/00; B60C 115/00
(52) U.S. Cl. ............... 152/209.5; 152/209.24; 152/209.26; 152/209.28
(58) Field of Search ............... 152/209.26, 209.18, 152/209.24, 209.15, 209.5, 209.27, 209.28

(56) References Cited

U.S. PATENT DOCUMENTS

| | | | | |
|---|---|---|---|---|
| 3,682,220 A | * | 8/1972 | Verdrer | 152/209.26 |
| 4,619,300 A | | 10/1986 | Tokunaga et al. | |
| 5,327,952 A | * | 7/1994 | Glover et al. | 152/209.26 |
| 5,431,208 A | * | 7/1995 | Aoki et al. | 152/209.26 |
| 5,503,206 A | * | 4/1996 | Consolacion et al. | 152/209.26 |
| 5,595,619 A | | 1/1997 | Masatoshi | |
| 5,658,404 A | * | 8/1997 | Brown et al. | 152/209.26 |
| 5,688,342 A | * | 11/1997 | Sugihara | 152/209.26 |
| 5,810,953 A | * | 9/1998 | Tanaka et al. | 152/209.26 |
| 5,957,179 A | * | 9/1999 | Graas | 152/209.26 |
| 6,105,643 A | * | 8/2000 | Rohueder et al. | 152/209.26 |

FOREIGN PATENT DOCUMENTS

| | | | |
|---|---|---|---|
| EP | 710577 | * | 5/1996 |
| FR | 2608516 | * | 6/1988 |
| JP | 6127215 | | 5/1994 |
| JP | 7276915 | | 10/1995 |
| JP | 9193615 | | 1/1997 |
| JP | 9-193615 | * | 7/1997 |

* cited by examiner

Primary Examiner—Steven D. Maki

(57) ABSTRACT

A pneumatic tire including a tread portion provided with two circumferential grooves to divide the tread portion into a pair of shoulder parts and a central part therebetween, each of the circumferential grooves has such a relatively wide width that the maximum axial width (GWmax) thereof in the foot print is not less than 35 mm, and in a meridian section of the tire, the axially inner sidewall each circumferential groove is substantially straight and inclined axially inwards, and the axially outer sidewall of the circumferential groove comprises a convex part extending axially outwardly to a merge point at which the convex part merges into a ground contacting top surface of one of the should parts.

10 Claims, 14 Drawing Sheets

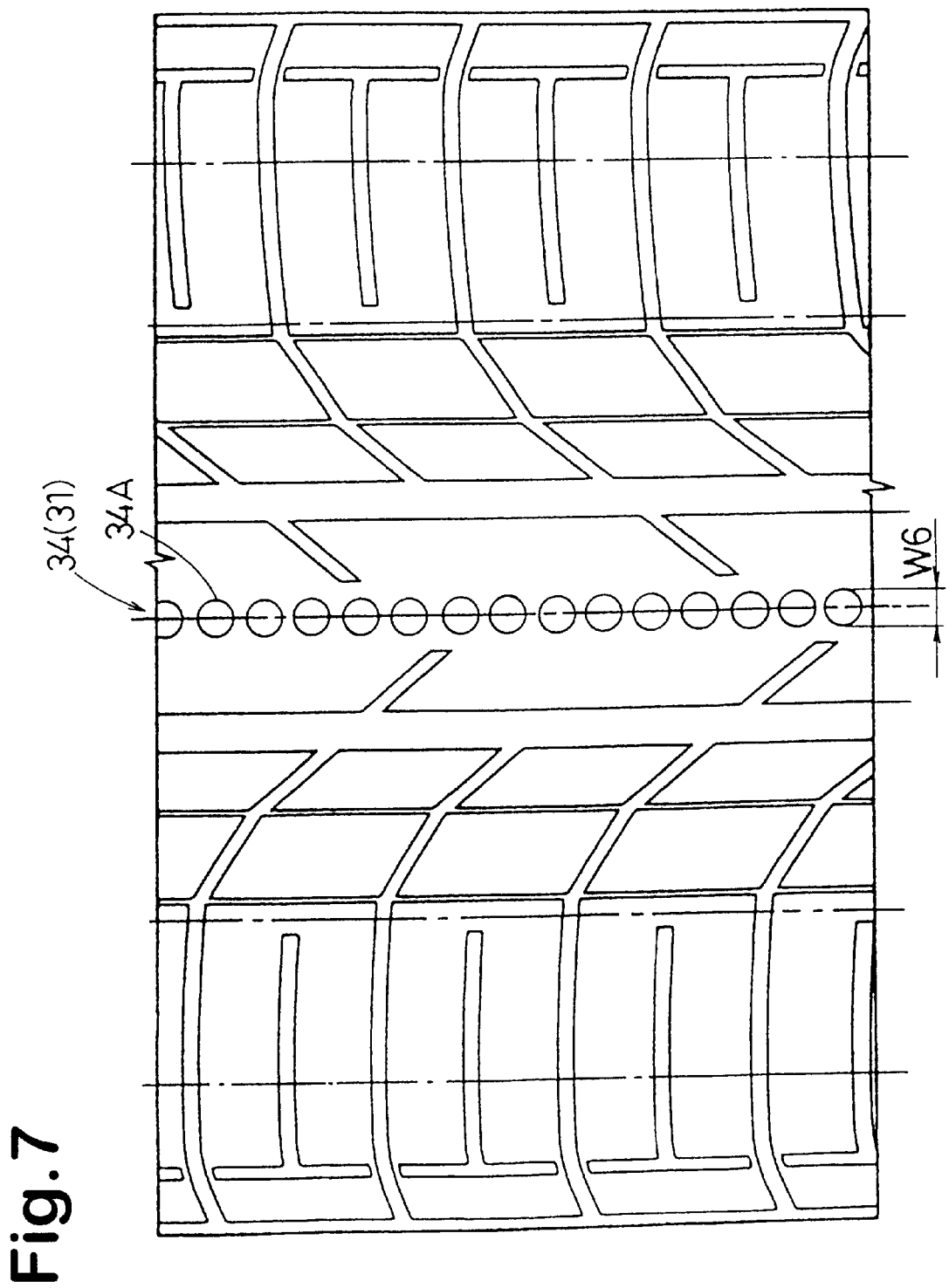

——— Camber angle = 0 deg.

— — — Camber angle = 3 deg.

PNEUMATIC TIRE INCLUDING TWO WIDE CIRCUMFERENTIAL GROOVES

FIELD OF THE INVENTION

The present invention relates to a pneumatic tire improved in wet performance, noise performance and steering stability.

In the laid-open Japanese Patent Applications JP-A-6-127215 and 7-276915, a pneumatic tire capable of improving wet performance and noise performance are disclosed, wherein, as shown in FIG. 14, the tread portion (t) is axially divided into a central part (e) and two shoulder parts (b) by two wide circumferential grooves (g). The central part (e) has a round profile extending from the bottom of one of the circumferential grooves to the bottom of the other. By contrast, each shoulder part (b) has a relatively edged corner between the top face and axially inner side face.

BACKGROUND OF THE RELATED ART

In such a pneumatic tire having wide circumferential grooves, the ground contacting area is inevitably decreased, and thereby it becomes difficult to satisfy requirements for the recent high performance cars, such as road grip performance in dry conditions, steering stability during cornering, initial steering response at the time of starting cornering, especially under high speed conditions.

SUMMARY

It is therefore, an object of the present invention to provide a pneumatic tire which is improved in the road grip performance, steering stability, steering response and the like without sacrificing excellent wet performance and noise performance of wide circumferential grooves.

According to the present invention, a pneumatic tire comprises a tread portion, two wide circumferential grooves dividing the tread portion into a pair of shoulder parts and a central part therebetween, each of the circumferential grooves having a groove bottom having an axially inner edge, an axially inner sidewall and an axially outer sidewall, in a meridian section of the tire, the axially inner sidewall extending substantially straight from said axially inner edge to a ground contacting top surface (2a) of the central part and inclined axially inwards, and the axially outer sidewall comprising a convex part extending axially outwardly to a merge point at which the convex part merges into a ground contacting top surface of one of the shoulder parts, in a foot print of the tire, each of the circumferential grooves having a maximum axial width of not less than 35 mm.

Therefore, when the tire load shifts towards the shoulder part during cornering, the convex part contacts with the ground to increase the ground contacting area, and the steering response, steering stability and the like can be improved. Further, the shoulder parts 10 are increased in the rigidity and the cornering force is increased, which also improve the steering stability.

BRIEF DESCRIPTION OF A PREFERRED EMBODIMENT

Embodiments of the present invention will now be described in detail in conjunction with the accompanying drawings.

Figure 6A:
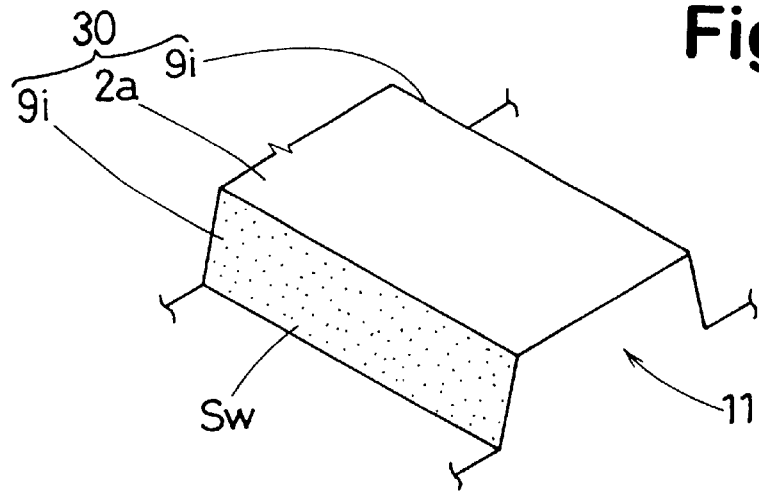
Figure 6B:
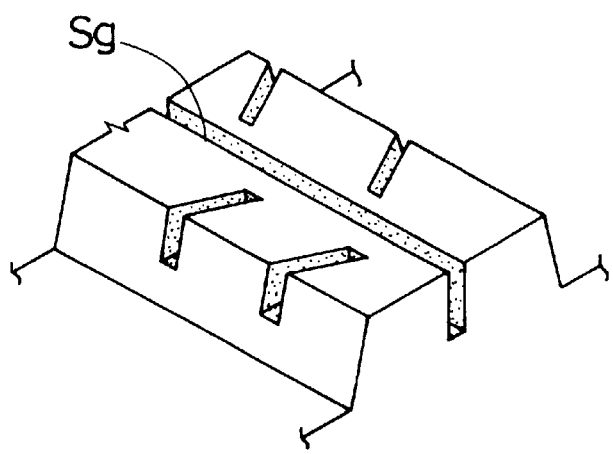
Figure 6C:
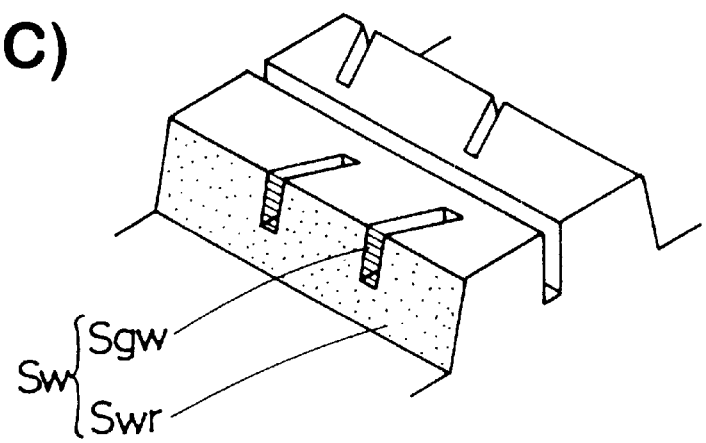

FIGS. 6(A), 6(B) and 6(C) are perspective views for explaining areas Sg, Swr and Sw.

Figure 8:
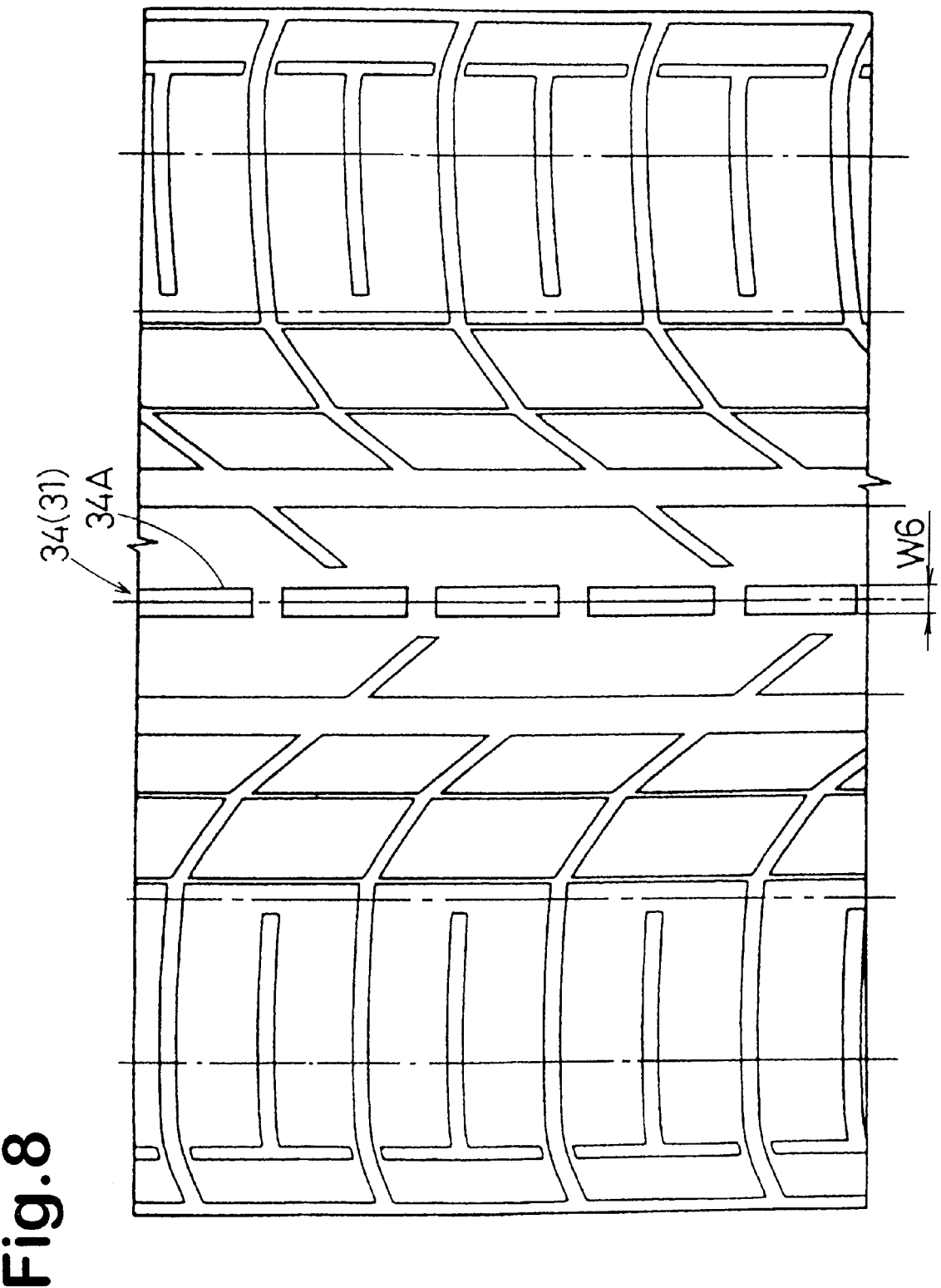

FIGS. 7 and 8 are developed views each showing another example of the tread pattern.

Figure 9:
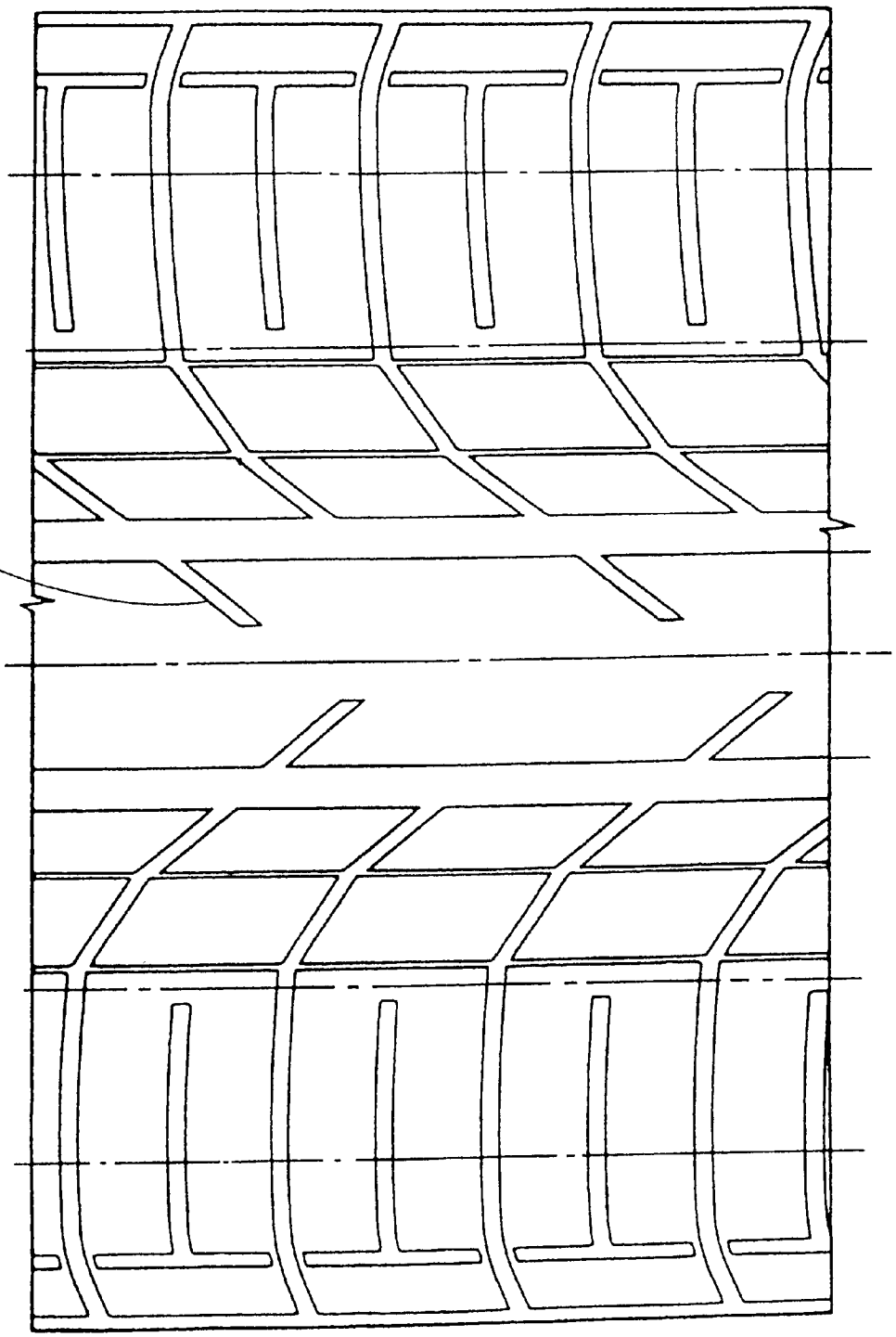

FIG. 9 is a developed view showing the tread pattern of comparative example B1 in Table 3.

Figure 10:
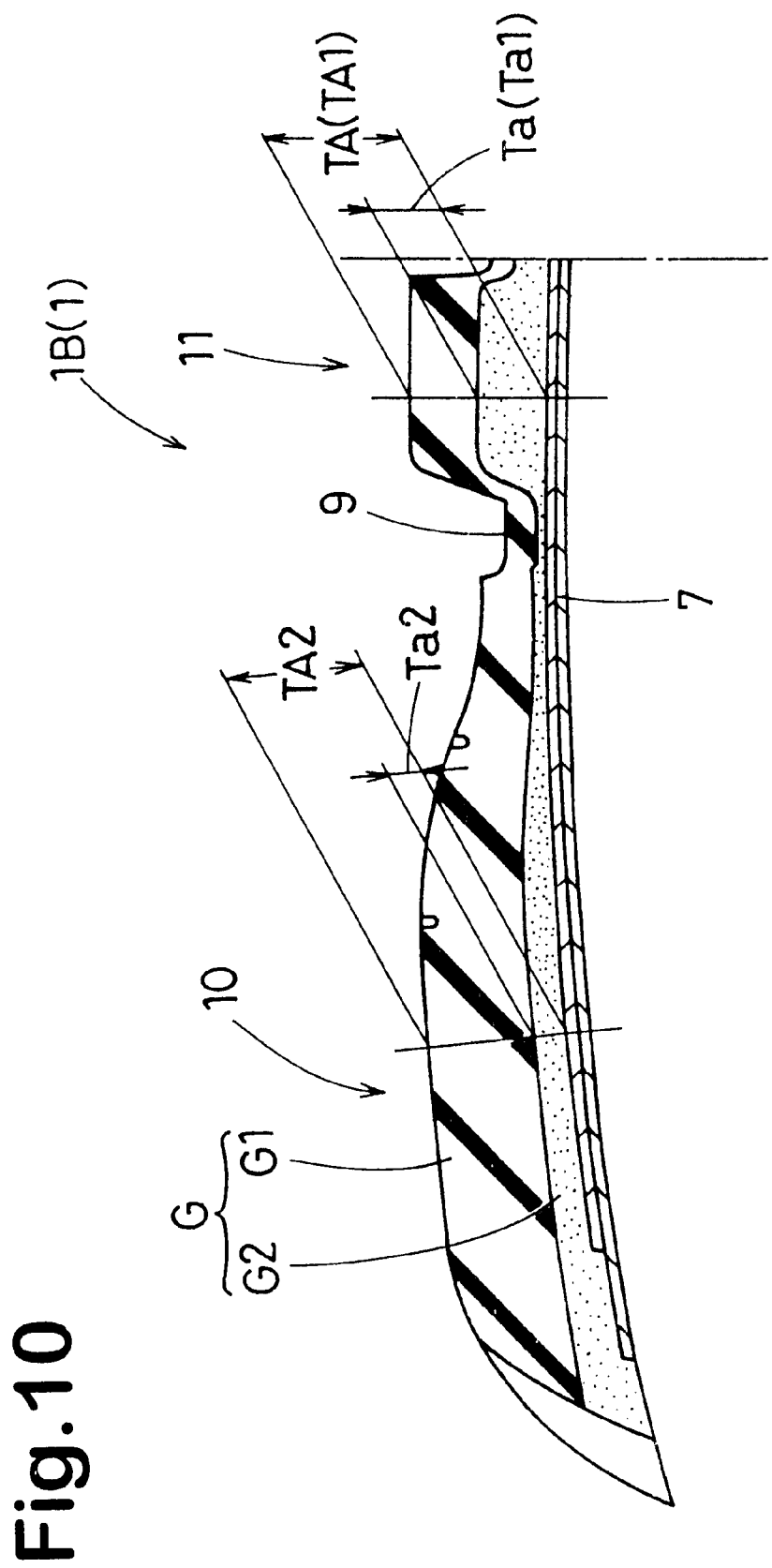

FIG. 10 is a cross sectional view showing an arrangement of a cap tread rubber and a base tread rubber.

Figure 11:
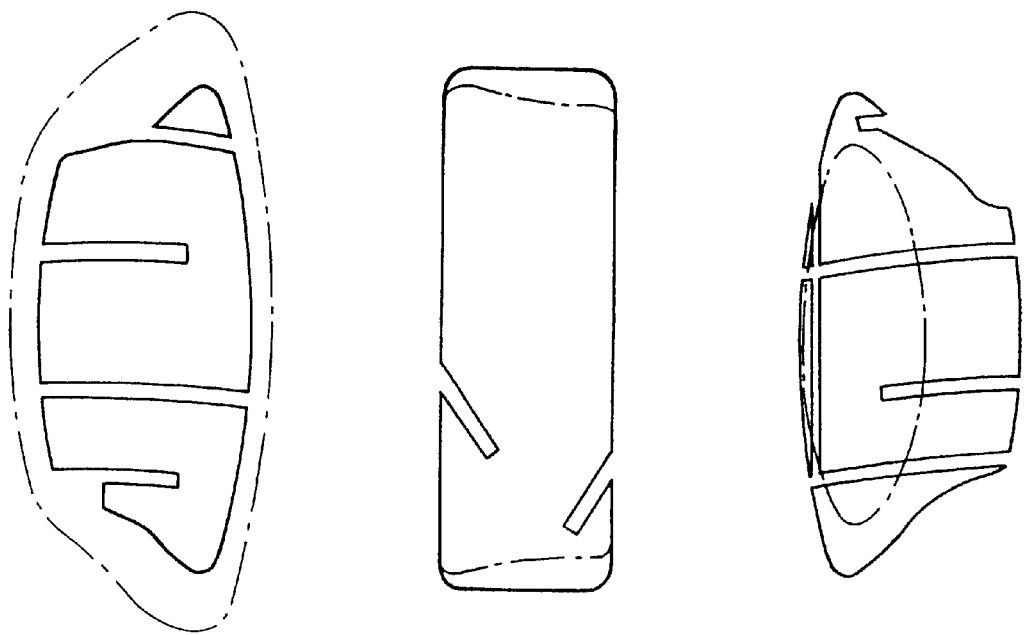

FIG. 11 shows the ground contacting area of the tire according to the present invention.

Figure 12:
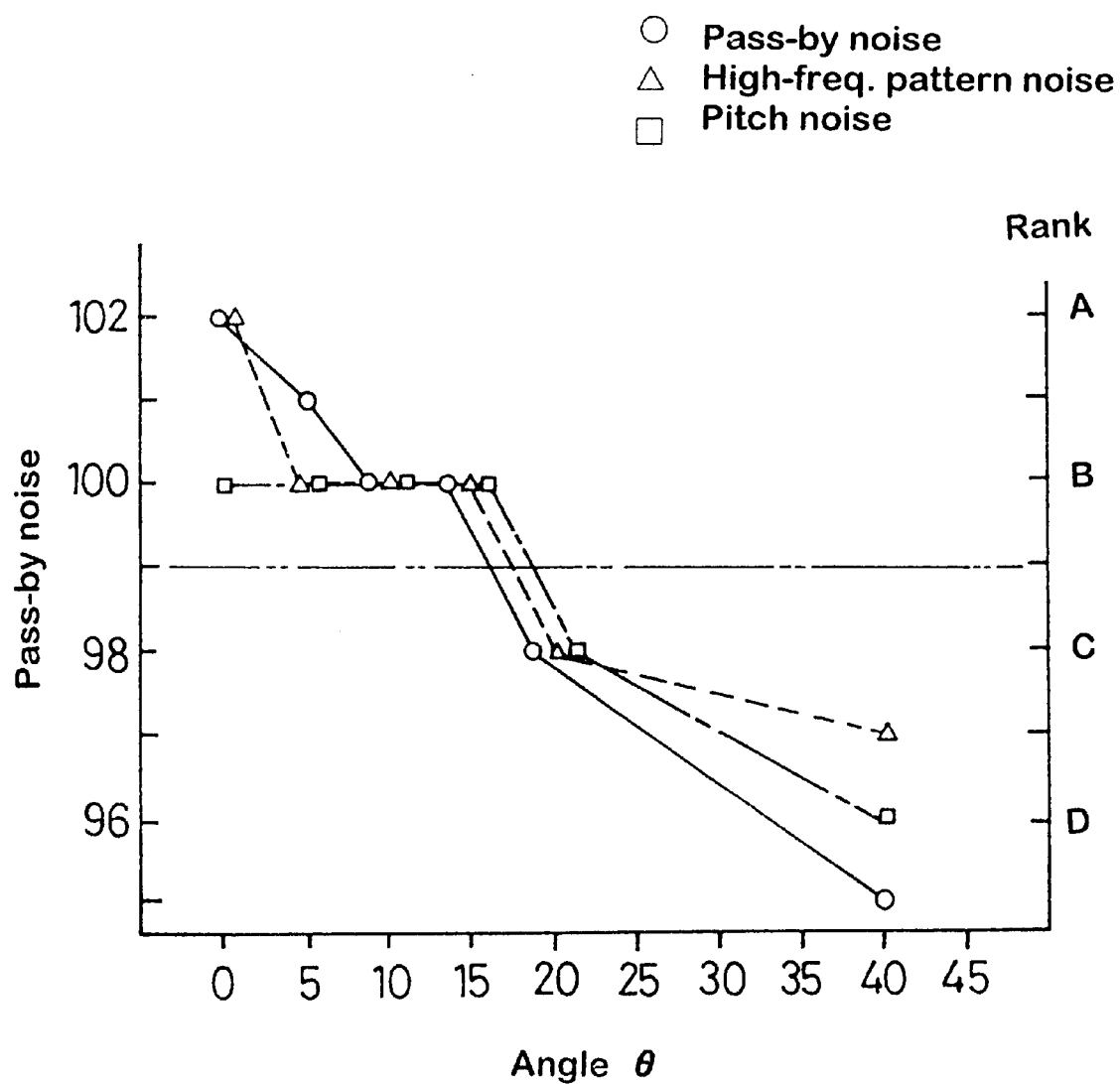

FIG. 12 is a graph showing relationships between the angle θ of the axial grooves and various noises.

Figure 13:
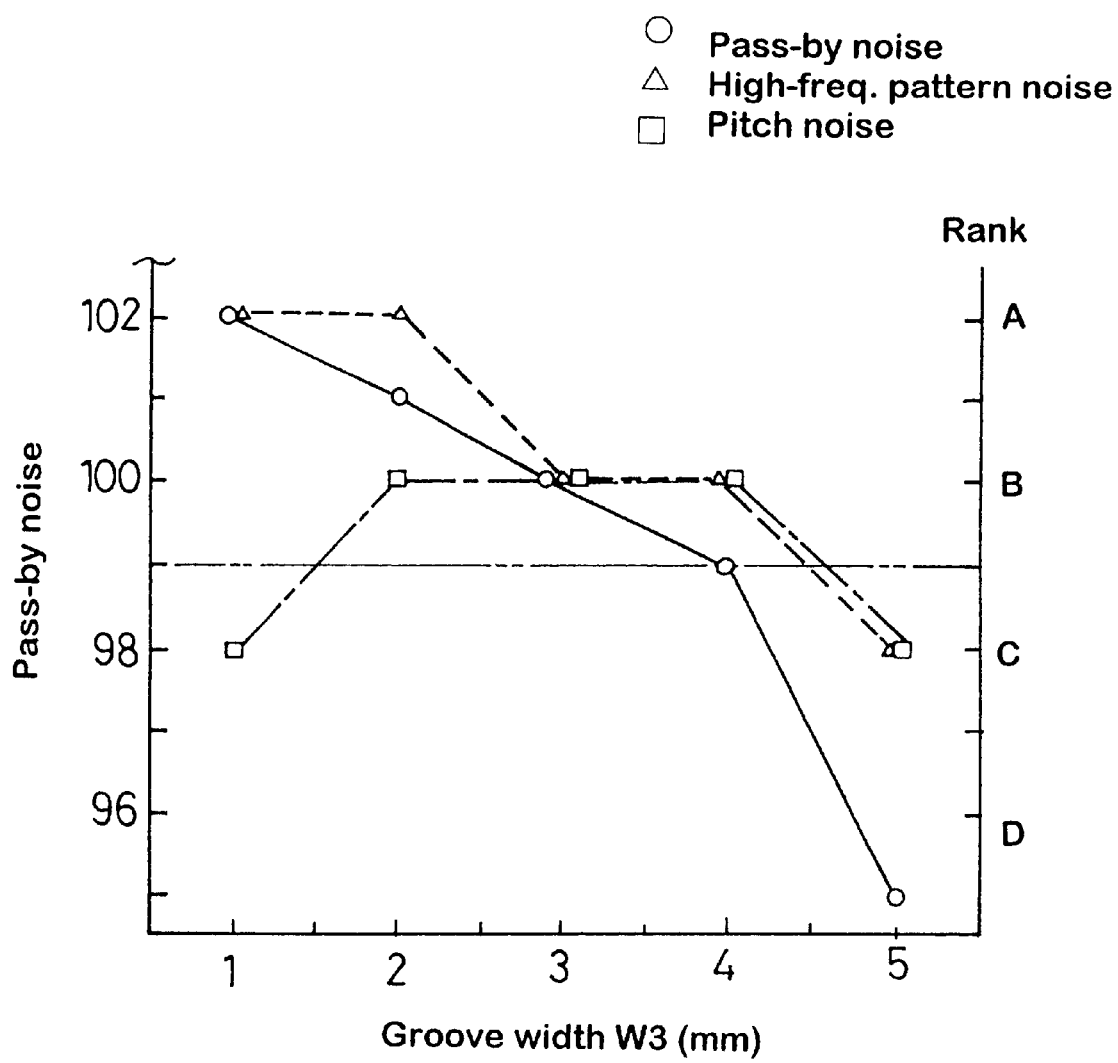

FIG. 13 is a graph showing relationships between the width W3 of the axial grooves and the noises.

Figure 14:
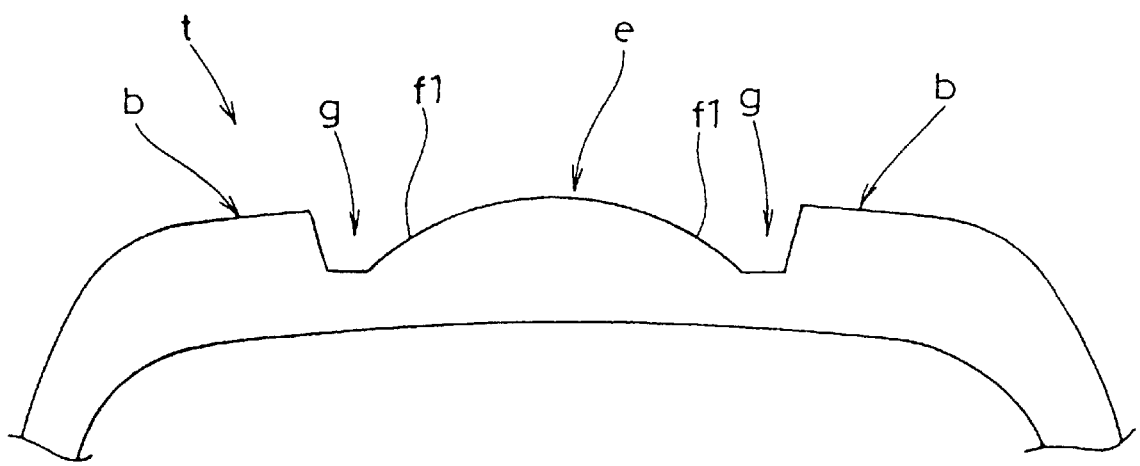

FIG. 14 is a sectional view of the tread portion of the prior art tire.

DETAILED DESCRIPTION OF A PREFERRED EMBODIMENT

In the drawings, pneumatic tire 1 according to the present invention has a tread portion 2, a pair of axially spaced bead portions 4, and a pair of sidewall portions 3 extending between the bead portions 4 and tread edges TE.

The tire 1 comprises a carcass 6 extending between the bead portions 4, a belt 7 disposed radially outside the carcass 6 in the tread portion 2, and a bead core 5 disposed in each of the bead portions 4.

Figure 1:
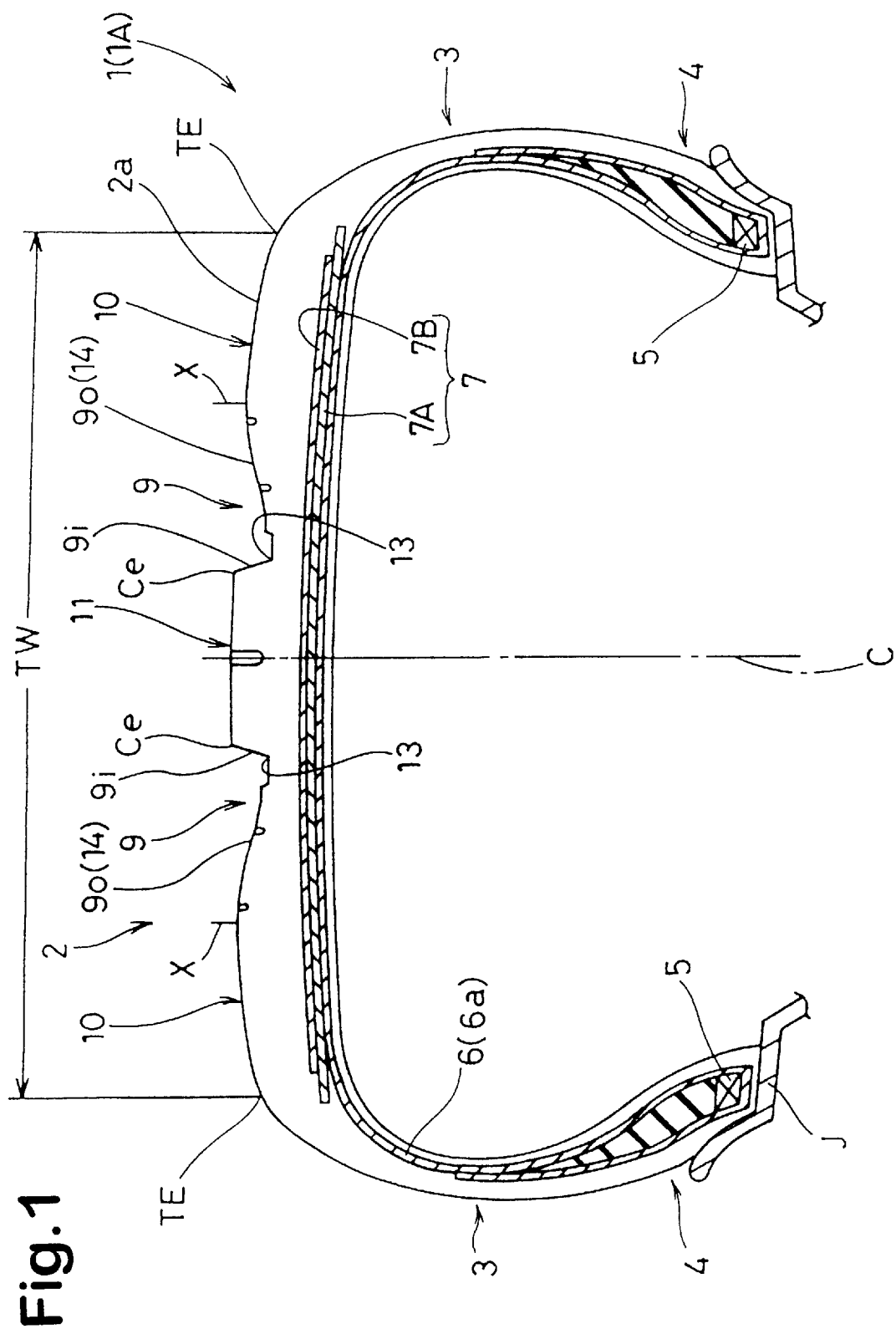
FIG. 1 is a cross sectional view of a pneumatic tire according to the present invention.

The tire 1 in this embodiment is a passenger car radial tire having a low aspect ratio of 0.4 to 0.6. And FIG. 1 shows a state in which the tire 1 is mounted on a standard rim J and inflated to a standard pressure and loaded with no tire load. (Hereinafter, normally inflated unloaded state or condition) Incidentally, the tread width TW mentioned later is the maximum axial width of the ground contacting area of the tread portion 2 under a standard loaded condition in which the tire 1 is mounted the standard rim J and inflated to the standard pressure and then loaded with the standard load.

Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 200 kPa is used as the standard pressure. The standard load is the "maximum load capacity" in JATMA, 70% of the "Load Capacity" in ETRTO, the maximum value given in the above-mentioned table in TRA or the like.

The above-mentioned carcass 6 preferably comprises at least one ply 6a of rubberized organic fiber cords such as polyester, nylon, rayon or the like, turned up around the bead core 5 in each bead portion from the axially inside to outside.

The belt comprises a breaker 7 and optionally a band. In the embodiment, the breaker 7 comprises at least two cross plies 7A and 7B of high modulus cords such as steel, aramid or the like laid at a small angle of 15 to 35 degrees with respect to the tire circumferential direction in parallel with each other in each ply but crosswise to the other ply. The band is disposed on the radially outside of the breaker belt 7 and composed of spiral windings of at least one cord or parallel cords, which are laid substantially in parallel with the tire circumferential direction. Usually, organic fiber cords, e.g. nylon cords are used in the band.

The tread portion 2 is provided on each side of the tire equator C with a wide circumferential groove 9 which extends substantially straight continuously in the circumferential direction, whereby the tread surface 2a is divided into a central part 11 between the two grooves 9 and a pair of shoulder parts 10 axially outside the grooves 9.

The central part 11 has a ground contacting top surface which is defined by an arc having a radius Rc of curvature and a center on th e tire equatorial plane C. Usually, the radius Rc is set in the range of not less than 500 mm, preferably not less than 1,000 mm.

Each of the shoulder parts 10 preferably has a ground contacting top surface defined by an arc having a radius Rs of curvature which is set in the range of not less than 100% preferably not less than 150 % of the tread width TW. In this embodiment, further an axially outer end portion of the shoulder part 10 is defined by an arc having a relatively small radius Re of curvature and extending beyond the tread edge TE. If the radius Rs is less than 100% of TW, the ground contacting width decreases and the ground pressure distribution is liable to become uneven.

In this example, the circumferential grooves 9 are disposed at axially symmetrical positions with respect to the tire equator C, but it may be possible to dispose asymmetrical positions.

Each circumferential groove 9 has a groove bottom 16, an axially inner sidewall 9i and an axially outer sidewall 9o.

In the meridian section of the tire under the above-mentioned normally inflated unloaded condition, the axially inner sidewall 9i is defined by a substantially straight line extending from the axially inner edge 13 of the groove bottom to an axial edge Ce of the top surface of the central part 11 while inclining towards the tire equator C at a small angle α. The angle α is preferably 5 to 15 degrees, more preferably 5 to 12 degrees with respect to a direction normal to the tread surface. (in this example, 10 degrees) Here, the "substantially straight" line means that this line can include a small concave or convex curve of which radius of curvature is less than 2 mm.

Figure 2:
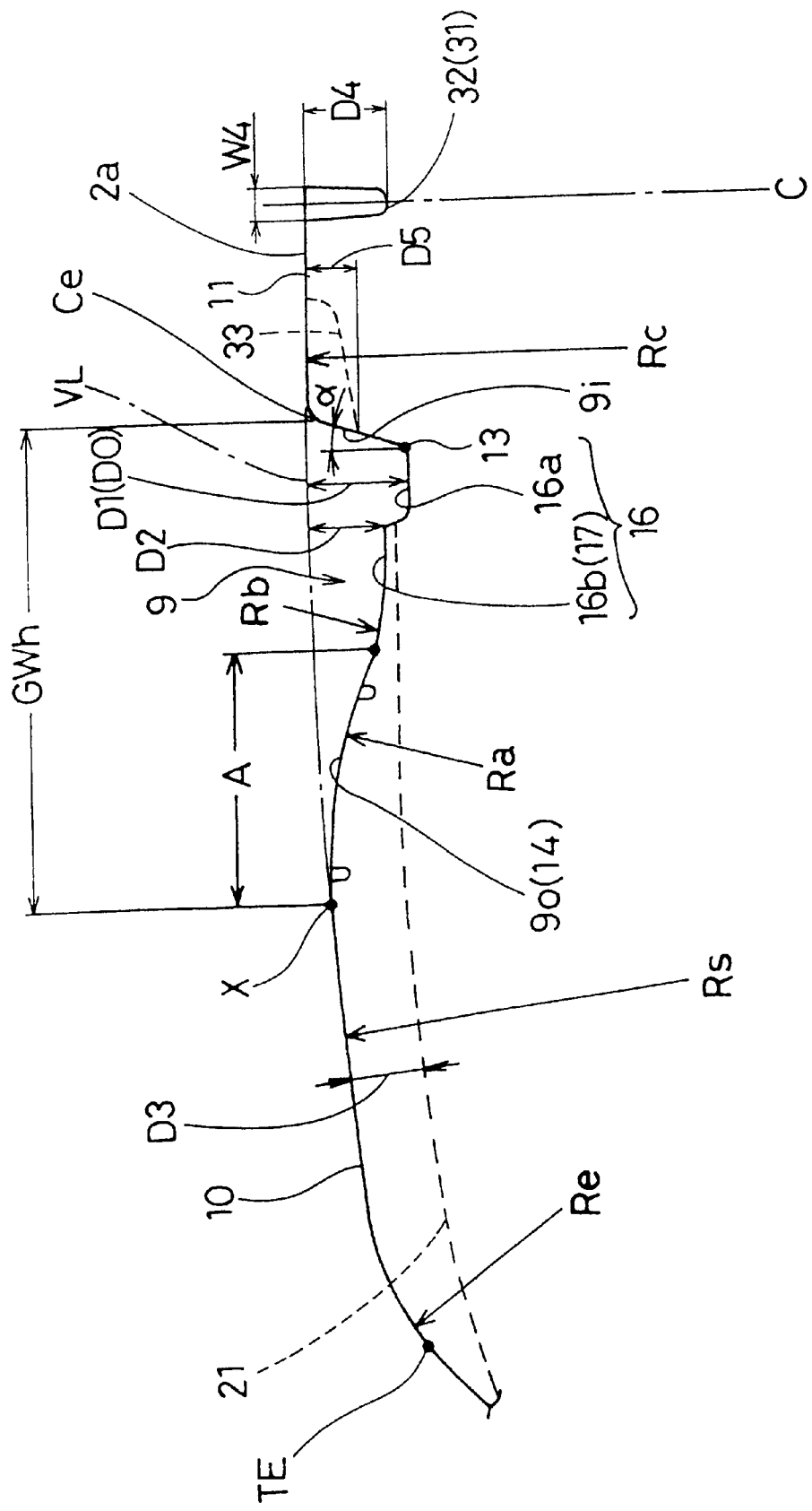
FIG. 2 is an enlarged cross sectional view showing a contour of the tread surface thereof.

The axially outer sidewall 9o is merged into the top surface of the shoulder part 10 at a merge point X as shown in FIG. 2. A major part 14 of the axially outer sidewall 9o which extends axially inwardly from this merge point X is covexly curved by a relatively large radius Ra. The radius Ra is set in the range of from 10 to 40%, preferably 20 to 30% of the tread width TW.

Under the normally inflated unloaded state, the axial width (A) of the convex part 14 is set in the range of from 0.4 to 0.7 times the width of the circumferential groove 9 or the axially distance GWn between the merge point X and the above-mentioned axial edge Ce of the central part 11.

If the edge Ce of the central part 11 is rounded, an intersection of extended lines of the inner sidewall 9i and the top surface 2a of the central portion is used instead.

The aquaplan resistance becomes high in a tire having a circumferential groove of which depth increases towards the tire equator in comparison with a tire having a circumferential groove of which depth is constant along the tire axial direction when the groove section areas are identical.

If the radius Ra is less than 10% of the width TW, it becomes difficult to secure an sufficient ground contacting area in the shoulder parts 10 during cornering. If more than 40%, the volume of the circumferential groove 9 is decreased and it becomes difficult to obtain a good wet performance of a wide circumferential groove.

As shown in FIG. 2 the groove bottom 16 of each circumferential groove 9 comprises a deep part 16a extending axially outwardly from the axially inner edge 13, and a shallow part 16b extending from the deep part 16a through a step to the convex part 14 so as to merge in to the convex part 14. The maximum groove depth D1 in the deep part 16a is preferably set in the range of from 3 to 7% of the tread width TW (in this embodiment about 9 mm). The maximum groove depth D2 in the shallow part 16b is preferably set to be less than the first groove depth D1 by at least 1.5 mm, preferably 2.0 to 4.5 mm. The shallow part 16b comprises a concave part 17 slightly curved convexly at a radius Rb less than the radius Ra. In this embodiment, the concave part 17 is equal to the shallow part 16b. The axially inner edge of the shallow part 16b is angled to secure the lateral road grip when the tread rubber is worn out.

Figure 3:
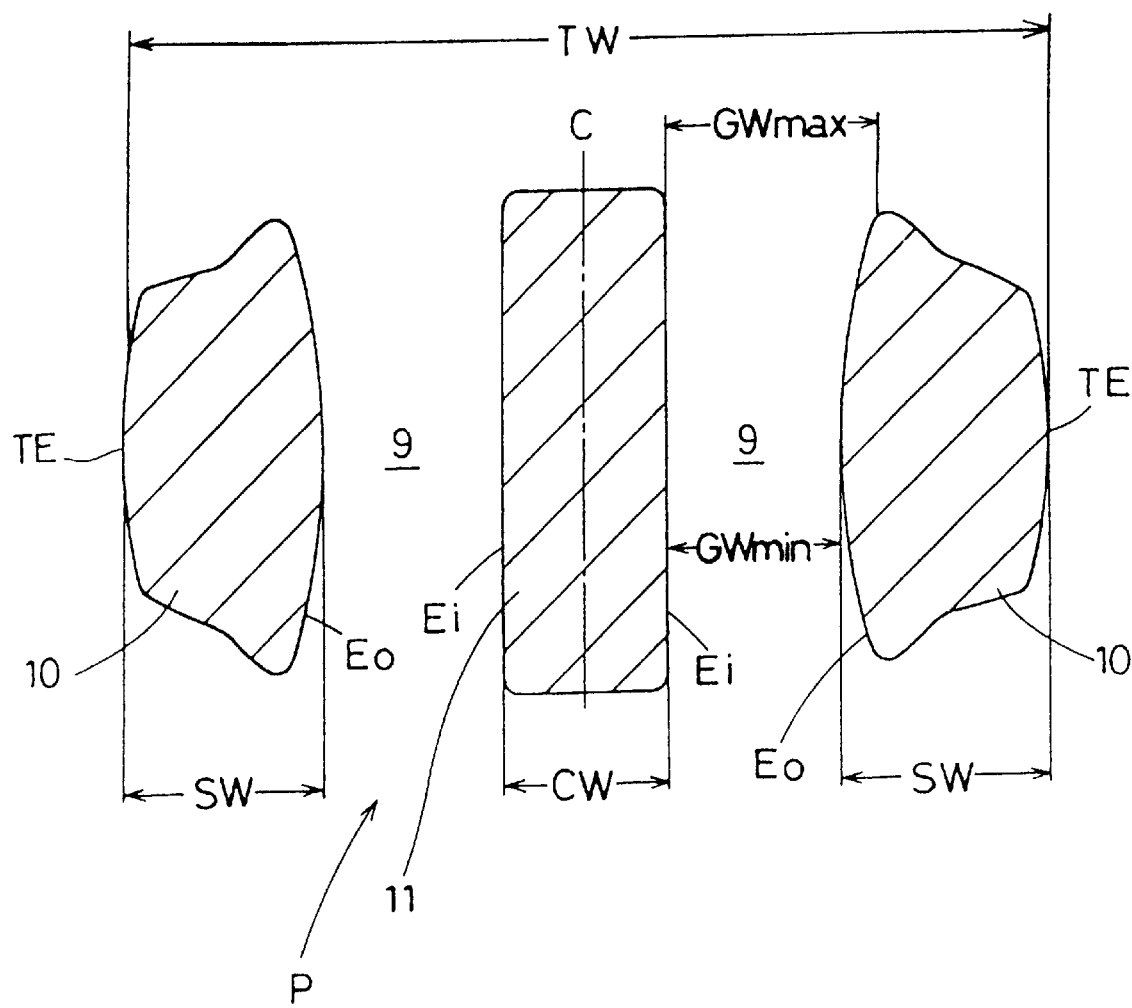
FIG. 3 shows the foot print showing the ground contacting region thereof.

FIG. 3 shows a foot print P of the tire under the above-mentioned standard loaded condition.

In the foot print P, each circumferential groove 9 has a maximum axial width GWmax in the range of not less than 35 mm, preferably, 35 to 55 mm when measured on the foot print P. The maximum axial width GWmax occurs at both the circumferential ends, and a minimum axial width GWmin lies in the middle of the circumferential length of the groove. As a result, a sufficient drainage can be obtained without causing the so called air tube resonance noise.

In the foot print P, the axially inner edge Ei of the circumferential groove 9 is substantially straight, but the axially outer edge Eo is concavely curved. Thus, the axial width therebetween becomes a minimum in the middle of the circumferential length and gradually increases towards both the circumferential ends. Preferably, the difference between the maximum groove width GWmax and minimum groove width GWmin is set in the range of from 4 to 15 mm.

Further, in the foot print P, the maximum axial width CW of the central part 11 is set in the range of from 15 to 30%, preferably 15 to 20% of the tread width TW, and preferably, the maximum axial width SW of the shoulder parts 10 is set in the range of not less than 80%, preferably not less than 100% of the maximum width CW of the central part 11, whereby the steering stability is improved.

In this embodiment, further, in order to improve the high-speed durability by controlling the heat generation in the central part 11, the central part 11 is provided with radiation dents 31.

Figure 5:
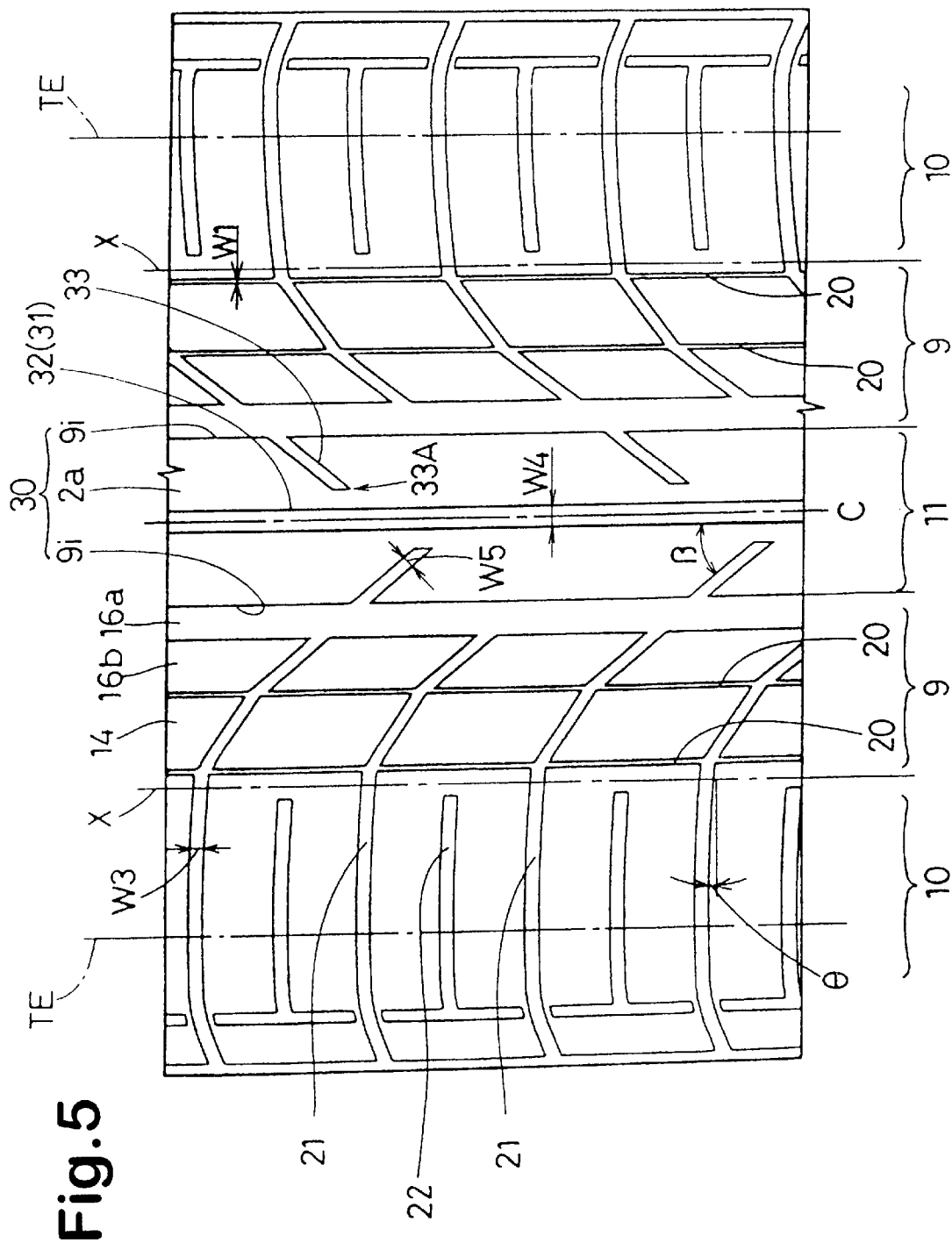
FIG. 5 is a developed view showing an example of the tread pattern.

The radiation dents 31 can be formed in various forms, e.g. a notch or slot 33 and a circumferentially continuous narrow groove 32 as shown in FIG. 5. a circumferential row 34 of independent holes 34a as shown in FIGS. 7 and 8.

In FIG. 5, the radiation dents 31 include at least one circumferentially continuous dent 32 disposed in the top surface of the central part 11, and slot-like dents 33 disposed on both sides of the central part 11.

Preferably, the circumferentially continuous dent 32 has a width W4 of from 3 to 5 mm and a depth D4 of from 0.8 to 1.0 times the maximum depth D0 of the circumferential groove 9. If the width W4 is less than 3 mm or the depth D4 is less than 0.8 times the depth D0, it becomes difficult to obtain a minimum radiation effect. If the width W4 is more than 5 mm or the depth D4 is more than 1.0 times the depth D0, the steering stability is liable to deteriorate.

Each of the slot-like dents 33 has an axially outer end opening to the circumferential groove 9 and an axially inner closed end 33A. The axially inner closed ends 33A are positioned before the circumferentially continuous dent 32 not to decrease the rigidity of the central part 11. In this embodiment, the slot-like dents 33 are inclined at an angle β of not more than 45 degrees with respect to the tire circumferential direction. As shown in FIG. 2, the maximum depth D5 of the slot-like dent 33 is set in a range of not more than 0.5 times the circumferential groove depth D0. As shown in FIG. 5, the width W5 of the slot-like dent 33 is set in a range of from 3 to 5 mm for the same reason as the width W4 of the circumferentially continuous dent 32.

In FIG. 7 and FIG. 8, a circumferential row 34 of independent dents 34A is disposed instead of the circumferentially continuous dent 32. For the openings of the independent dents 34A, various shapes, e.g. a complete round, ellipses, a regular square, rectangles, rhombuses, polygons and the like may be used. The axial width W6 of the independent dents 34A is preferably set in a range of from 3 to 5 mm for the same reason as the circumferentially continuous dent 32. And the depth is preferably set in the range of from 0.8 to 1.0 times the circumferential groove depth D0.

In FIG. 7, the dents 31 include the independent dents 34A having a complete round shape having a width or diameter W6, and also the slot-like dents.

In FIG. 8, the dents 31 include the independent dents 34A having a rectangular shape having a width W6, and also the slot-like dents.

Preferably, the radiation dents 31 are formed to satisfy the following condition:

$$(Sg+Swr)/Sw >= 2.0$$

wherein

Swr=Sw−Sgw

Sw is the total area of the axially inner sidewalls 9i,

Sg is the total of the surface areas of the radiation dents 31, and

Sgw is the total of the areas of the openings of the radiation dents 31 (in FIGS. 5,7 and 8, slot-like dents 33) in both the axially inner sidewalls 9i, whereby heat radiation becomes effective and temperature rise during high speed running can be controlled. For better understanding of Sw, Sg and Sgw, they are indicated as shaded areas in FIGS. 6 (A) to (C) wherein a combination of a continuous dent 32 and slot-like dents 33 is taken as an example. Incidentally, if there is no opening in the axially inner sidewalls 9i, Sgw=0, and thus Swr=Sw. If (Sg+Swr)/Sw is less than 2.0, it is difficult to improve the high-speed durability. If (Sg+Swr)/Sw exceeds about 4.0, it becomes difficult for the central part 11 to secure a minimum rigidity or ground contacting area, and it is difficult to improve the steering stability. Therefore, (Sg+Swr)/Sw is preferably set in the range of not more than 4.0.

In the tread patterns shown in FIGS. 5, 7 and 8, the shoulder parts 10 are provided with axial grooves 21 each extending from one of the tread edges TE to one of the circumferential grooves 9. The bottom of the axial groove 21 is deeper than the shallow part 16b of the circumferential groove 9, and extends to the deep part 16a.

In this embodiment, the shoulder parts 10 are further provided with axial grooves 22 disposed alternately with the above-mentioned axial grooves 21. The axial grooves 22 terminate before the merge point X so as not to connect with the circumferential groove 9.

At the merge point X, the angle θ of the axial grooves 21 is set in a range of from 0 to 15 degrees with respect to the tire axial direction.

If the axially outer sidewall 9o is straight contrary to the present invention, running noise becomes reduced as the angle θ increases. However, in the present invention, the noise increases as the angle θ increases and especially when the angle θ exceeds 15 degrees, the noise performance greatly deteriorates.

As to the inclination angle of the axial grooves 21 and 22 with respect to the tire axial direction, it is possible to decrease the inclination angle from the tire equator to the tread edge to provide the axial grooves with a curved configuration.

The width W3 of the axial grooves 21 and 22 at the groove top is preferably set in the range of from 0.009 to 0.018 times, more preferably 0.013 to 0.018 times the tread width TW. If the width W3 exceeds 0.018 times the tread width TW, running noise is liable to increase. If the width W3 is less than 0.009 times the tread width TW, the drainage becomes worse.

The depth D3 of the axial grooves 21 and 22 is preferably set in the range of not more than 1.0 times the circumferential groove depth D0 for the rigidity of the shoulder parts 10.

The above-mentioned depths D1, D2 and D3 satisfy the following relationship: D2=<D3=<D1.

Further, each of the convex parts 14 is provided near the groove bottom 16 and merge point X with two circumferentially extending narrow and shallow grooves 20. These grooves 20 have a depth of not more than 0.3 times the circumferential groove depth D0 (for example about 2 mm), and a width W1 of not more than 5 mm, preferably not more than 4 mm, more preferably not more than 3 mm, whereby the grooves 20 can improve the wear resistance of the convex part 14 to balance the wear with that in the shoulder parts 10.

Furthermore, the tread portion 2 is made of a radially outer cap rubber G1 defining the ground contacting top surface 2a and a radially inner base rubber G2 disposed on the radially outside of the belt 7 and radially inside the cap rubber G1 as shown in FIG. 10.

The cap rubber G1 has a loss tangent δ1 in the range of from 0.15 to 0.30. The base rubber G2 has a loss tangent δ2 in the range of from 0.05 to 0.20 which is lower than the loss tangent δ1.

Preferably, the cap rubber G1 has a complex elastic modulus E1 in the range of from 6.0 to 8.0 Mpa, and the base rubber G2 has a complex elastic modulus E2 in the range of form 7.0 to 9.0 Mpa and more than the complex elastic modulus E1.

Preferably, the cap rubber G1 has a durometer type-A hardness H1 in the range of from 67 to 72 degrees, and the base rubber G2 has a durometer type-A hardness H2 in the range of from 70 to 75 degrees.

As to the ratio Ta/TA of the thickness Ta of the base rubber G2 to the total rubber thickness TA, the ratio Ta1/TA1 in the central part 11 is set to be larger than the ratio Ta2/TA2 in the shoulder parts 10. Preferably, the ratio Ta1/TA1 is set in the range of from 0.4 to 0.5, and the ratio Ta2/TA2 is set in the range of from 0.15 to 0.25.

If the loss tangent δ2 is less than 0.05, the required elasticity is lost. If the loss tangent δ2 is more than 0.20, it becomes difficult to improve the high-speed durability. If the loss tangent δ1 is outside the above-mentioned range, the road grip, rolling resistance and wear resistance becomes worse. Especially if the loss tangent δ1 is more than 0.30, heat generation increases and the high-speed durability decreases.

The loss tangent δ and complex elastic modulus E are measured under the following conditions: a temperature of 70 degrees C, a dynamic distortion of plus/minus 1%, and a frequency of 10 Hz. The durometer type-A hardness is measured with a durometer type-A according to Japanese Industrial Standard K-6253.

Comparison Tests

Embodiment A

Test tires of size 245/45ZR16 having the tread pattern shown in FIG. 5 and the same structure shown in FIG. 1 except for the contour were made and tested for the pass-by noise, cornering power, aquaplaning occurring speed and steering stability. The specifications of the tires and test results are shown in Table 1.

(1) Pass-by noise test

According to the "Test Procedure for Tire Noise" specified in Japanese JASO-C606, a test car provided with test tires was coasted for 50 meter distance at a speed of 60 km/h in a straight test course, and the maximum noise sound level in dB(A) was measured with a microphone set at 1.2 meter height from the road surface and 7.5 meter sideways from the center line of the course. The results are indicated by an index based on Embodiment A1 being 100, wherein the larger the index, the better the pass-by noise.

(2) Cornering power test

Using an indoor tire tester, the cornering power was measured under a tire load of 4.5 kN and an inner pressure of 200 kPa. The results are indicated by an index based on Embodiment A1 being 100, wherein the larger the index, the better the cornering power.

(3) Aquaplane test

A test car provided on all four wheels with test tires was run on a wet asphalt road with a 20 m long 10 mm depth water pool along a 100 meter radius circle, and the maximum lateral-G was measured t o obtain the average value from 50 to 80 km/h. The results are indicated by an index based on Embodiment A1 being 100, wherein the larger the index, the higher the resistance to aquaplane.

(4) Dry steering stability test:

During running a 3000 cc FR type car on an a sphalt circuit course, steering stability was evaluated by the test driver's feeling, wherein the larger the index, the better the stability. (Inner pressure: 230 kPa)

TABLE 1

Figure 4:
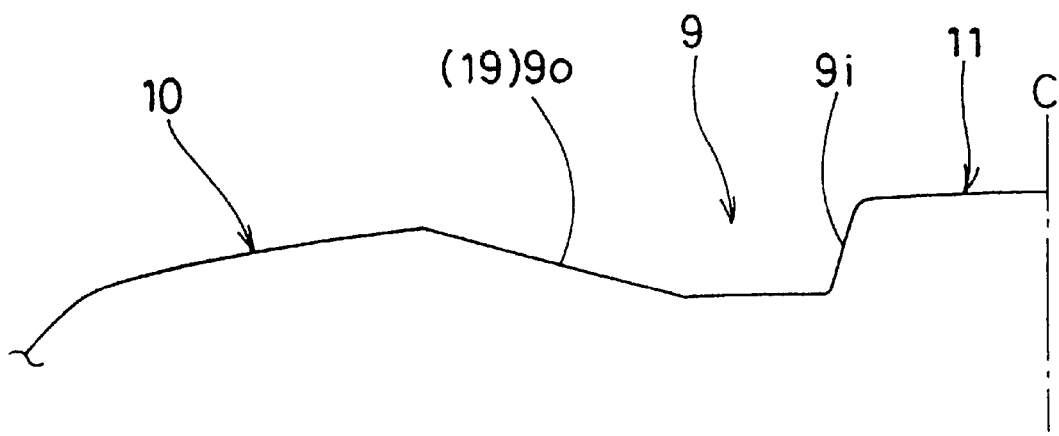
FIG. 4 is a schematic cross sectional view showing a contour of the tread portion of a comparative example.

|  | Ex. A1 | Ex. A2 | Ex. A3 | Ex. A4 | Ex. A5 | Ref. A1 | Ref. A2 | Ex. A6 | Ex. A7 | Ref. A3 | Ref. A4 |
| --- | --- | --- | --- | --- | --- | --- | --- | --- | --- | --- | --- |
| Contour of Tread portion Circumferential Groove | FIG. 2 | FIG. 2 | FIG. 2 | FIG. 2 | FIG. 2 | FIG. 7 | FIG. 4 | FIG. 2 | FIG. 2 | FIG. 2 | FIG. 2 |
| Angle α of Inner sidewall (deg.) | 10 | 5 | 12 | 10 | 10 | curved surface | 10 | 10 | 10 | 10 | 10 |
| Radius Ra (mm) | 55 | 55 | 55 | 30 | 71 | — | straight line | 55 | 55 | 10 | 92 |
| Radius Rb (mm) | 35 | 35 | 35 | 35 | 35 | — | — | 35 | 35 | 35 | 35 |
| Ra/TW (%) | 27 | 27 | 27 | 15 | 35 | — | — | 27 | 27 | 5 | 45 |
| Maximum width GWmax (mm) | 48 | 48 | 48 | 45 | 50 | — | — | 48 | 48 | 43 | 52 |
| Depth D1 (mm) | 9 | 9 | 9 | 9 | 9 | — | — | 9 | 9 | 9 | 9 |
| Depth D2 (mm) | 6.7 | 6.7 | 6.7 | 6.7 | 6.7 | — | — | 7.5 | 4.5 | 6.7 | 6.7 |
| Groove width GWn (mm) | 40 | 40 | 40 | 40 | 40 | — | — | 40 | 40 | 40 | 40 |
| Width A (mm) | 21 | 21 | 21 | 21 | 21 | — | — | 21 | 21 | 21 | 21 |
| Pass-by noise | 100 | 100 | 100 | 100 | 100 | 100 | 100 | 100 | 100 | 100 | 100 |
| Cornering power | 100 | 98 | 101 | 97 | 101 | 92 | 95 | 99 | 105 | 94 | 103 |
| Aquaplaning occurring speed | 100 | 102 | 99 | 102 | 99 | 98 | 102 | 102 | 97 | 105 | 96 |
| Dry steering stability | 6.00 | 5.75 | 6.00 | 5.50 | 6.50 | 5.00 | 5.50 | 6.00 | 6.75 | 4.00 | 6.5 |
| Common Data |  |  |  |  |  |  |  |  |  |  |  |
| Tread width TW (mm) | 204 |  |  |  |  |  |  |  |  |  |  |

TABLE 1-continued

|  | Ex. A1 | Ex. A2 | Ex. A3 | Ex. A4 | Ex. A5 | Ref. A1 | Ref. A2 | Ex. A6 | Ex. A7 | Ref. A3 | Ref. A4 |
|---|---|---|---|---|---|---|---|---|---|---|---|
| Central part |  |  |  |  |  |  |  |  |  |  |  |
| Maximum width CW (mm) | 40 |  |  |  |  |  |  |  |  |  |  |
| CW/TW (%) | 20 |  |  |  |  |  |  |  |  |  |  |
| Radius Rc (mm) | 1240 |  |  |  |  |  |  |  |  |  |  |
| Shoulder part |  |  |  |  |  |  |  |  |  |  |  |
| Maximum width SW (mm) | 44 |  |  |  |  |  |  |  |  |  |  |
| SW/TW (%) | 22 |  |  |  |  |  |  |  |  |  |  |
| Radius Rs (mm) | 574 |  |  |  |  |  |  |  |  |  |  |
| Radius Re (mm) | 23 |  |  |  |  |  |  |  |  |  |  |

From the test results, it was confirmed that the example tires according to the present invention can be improved in the cornering power, aquaplaning occurring speed, steering stability, and pass-by noise.

Further, FIG. 11 shows a foot print of Embodiment tire when the camber angle is 0 degrees (solid line) and a foot print when the camber angle is 3 degrees (broken line) which shows that the ground contacting area of the shoulder part was increased.

Embodiment B

Test tires provided with contour specified in Table 2 and radiation dents specified in Table 3 were prepared and tested for the high-speed durability and dry steering stability.

(5) High-speed durability test

After the test tire was run for 10 minutes at a speed of 200 km/h under a tire load of 4.7 KN and an inner pressure of 300 kpa, the internal temperature of the central part was measured.

TABLE 2

| Contour of Tread portion | FIG. 2 |
|---|---|
| Tread width TW (mm) | 226 |
| Circumferential Groove |  |
| Angle α of Inner sidewall (deg.) | 10° |
| Radius Ra (mm) | 55 |
| Radius Rb (mm) | 35 |
| Width A (mm) | 21 |
| Ra/TW (%) | 24.3 |
| Maximum width GWmax (mm) | 48 |
| Width GWn (mm) | 40 |
| Depth D1 (mm) | 9.0 |
| Depth D2 (mm) | 6.7 |
| Central part |  |
| Maximum width CW (mm) | 40 |
| CW/TW (%) | 20 |
| Radius Rc (mm) | 1240 |
| Shoulder part |  |
| Maximum width SW (mm) | 44 |
| SW/TW (%) | 19.5 |
| Radius Rs (mm) | 57.4 |
| Radius Re (mm) | 23 |

TABLE 3

|  | Ref. B1 | Ex. B1 | Ex. B2 | Ex. B3 | Ex. B4 | Ref. B2 |
|---|---|---|---|---|---|---|
| Radiation dent | FIG. 9 | FIG. 5 | FIG. 5 | FIG. 7 | FIG. 8 | — |
| Slot-like dent | Present | Present | Present | Present | Present | Present |
| width/depth (mm) | 2.2/3.2 | 2.2/3.2 | 2.2/3.2 | 2.2/3.2 | 2.2/3.2 | — |
| Circumferentially continuous dent | — | Present | Present | — | — | — |
| width/depth (mm) | — | 3/9.1 | 5/9.1 | — | — | — |
| Independent dent row | — | — | — | Present | Present | — |
| width/depth (mm) | — | — | — | 7/9.1 | 3/7.5 | — |
| Sw (sq.mm) | 39580 | 39580 | 39580 | 39580 | 39580 | 39580 |
| Sg + Swr (sq.mm) | 49612 | 89192 | 89192 | 89192 | 82860 | 39580 |
| (Sg + Swr)/Sw | 1.25 | 2.25 | 2.25 | 2.25 | 2.09 | 1.00 |
| High-speed durability (deg. C.) | 92 | 83 | 80 | 76 | 85 | 96 |
| Steering stability | 3 | 3 or 3⁻ | 3⁻ | 2.5 | 3 | 3 |

Embodiment C

Test tires having the contour specified in Table 2 and a tread portion made of the cap rubber and base rubber specified in Table 4 were prepared and tested for the high-speed durability and steering stability.

TABLE 4

|  | Ref. C1 | Ex. C1 | Ex. C2 | Ex. C3 |
|---|---|---|---|---|
| Cap tread rubber |  |  |  |  |
| Loss tangent δ 1 | 0.30 | 0.30 | 0.30 | 0.30 |
| Complex elastic modulus E1 (Mpa) | 6.8 | 6.8 | 6.8 | 6.8 |
| Base tread rubber |  |  |  |  |
| Loss tangent δ 2 | 0.19 | 0.19 | 0.19 | 0.19 |
| Complex elastic modulus E2 (Mpa) | 7.6 | 7.6 | 7.6 | 7.6 |
| Thickness ratio Ta/TA |  |  |  |  |
| at central portion | 0.2 | 0.5 | 0.4 | 0.3 |
| at shoulder portion | 0.2 | 0.2 | 0.2 | 0.2 |
| Radiation dent | FIG. 9 | FIG. 9 | FIG. 9 | FIG. 9 |
| (Sg + Swr)/Sw | 1.25 | 1.25 | 1.25 | 1.25 |
| High-speed durability (deg. C.) | 92 | 80 | 84 | 88 |
| Steering stability | 3 | 3+ | 3+ | 3 or 3+ |

As shown in Table 3 and 4, it was confirmed that Embodiment tires can be effectively controlled in the temperature rise in the central part. Thus the high-speed durability can be greatly improved without deteriorating the steering stability.

Embodiment D

Test tires having the contour specified in Table 2 and the axial grooves specified in Table 5 were prepared and tested for the pass-by noise (external noise) and also internal noise.

(6) Internal noise test:

Running the test car on an asphalt test course at a speed 60 km/h, the test driver evaluated the high-frequency pattern noise and pitch noise into four ranks A to C by his feelings. (A: very good, B:good, C:average, D:poor)

TABLE 5

|  | Ex. D1 | Ex. D2 | Ex. D3 | Ex. D4 | Ref. D1 | Ref. D2 | Ex. D5 | Ex. D6 | Ex. D7 (3) | Ex. D8 | Ex. D9 |
|---|---|---|---|---|---|---|---|---|---|---|---|
| Angle θ (deg.) | 0 | 5 | 10 | 15 | 20 | 40 | 10 | 10 | 10 | 10 | 10 |
| Depth D3 (mm) | 7 | 7 | 7 | 7 | 7 | 7 | 7 | 7 | 7 | 7 | 7 |
| Width W3 (mm) | 3 | 3 | 3 | 3 | 3 | 3 | 1 | 2 | 3 | 4 | 5 |
| W3/TW | 0.0133 | 0.0133 | 0.0133 | 0.0133 | 0.0133 | 0.0133 | 0.0044 | 0.0088 | 0.0133 | 0.0177 | 0.0221 |
| Pass-by noise | 102 | 101 | 100 | 100 | 98 | 95 | 102 | 101 | 100 | 99 | 95 |
| High-frequency pattern noise | A | B | B | B | C | C to D | A | A | B | B | C |
| Pitch noise | B | B | B | B | C | D | C | B | B | B | C |

FIG. 12 shows relationships between the angle θ of the axial grooves and the pass-by noise, high-frequency pattern noise and pitch noise obtained from the test results.

FIG. 13 shows relationships between the width W3 of the axial grooves and the pass-by noise, high-frequency pattern noise and pitch noise.

As shown in Table 5 and FIGS. 12 and 13, Embodiment tires can be improved in the noise performance.

The present invention is suitably applied to a pneumatic tire for passenger cars, but it is also possible to apply to tires for RV, light-truck, light-van and the like.

What is claimed is:

1. A pneumatic tire comprising a tread portion, two wide circumferential grooves dividing the tread portion into a pair of shoulder parts and a central part therebetween, each of the circumferential grooves having a groove bottom having an axially inner edge, an axially inner sidewall and an axially outer side wall, in a meridian section of the tire, said axially inner sidewall extending substantially straight from said axially inner edge to a ground contacting top surface of the central part and inclined axially inwards, and said axially outer sidewall comprising a convex part extending axially outwardly to a merge point at which the convex part merges into a ground contacting top surface of one of the shoulder parts, in a foot print of the tire, each of the circumferential grooves having a maximum axial width of not less than 35 mm, a radius of curvature of said convex part being 10 to 40% of a tread width of the tread portion on the footprint, and under a normally inflated unloaded state of the tire, the axial width of the convex part being 0.4 to 0.7 times the width of the circumferential groove.

2. The pneumatic tire according to claim 1, wherein the groove bottom comprises a deep part extending axially outwardly from said axially inner edge, and a shallow part extending axially outwardly from the deep part through a step so as to merge into said convex part.

3. The pneumatic tire according to claim 2, wherein the shallow part includes a concave part having a radius of curvature less than the radius of said convex part.

4. The pneumatic tire according to claim 1, wherein in said foot print, the maximum axial width of the central part is in a range of from 15 to 30% of a tread width of the tread portion, and the maximum axial width of each of the shoulder parts is not less than 80% of the maximum axial width of the central part.

5. The pneumatic tire according to claim 1, wherein the central part is provided with radiation dents.

6. The pneumatic tire according to claim 5, wherein said radiation dents include a circumferentially continuous dent disposed in the ground contacting top surface of the central and having a width of from 3 to 5 mm and a depth in the range of from 0.8 to 1.0 times the depth of the circumferential grooves.

7. The pneumatic tire according to claim 1, wherein the tread portion includes a radially outer cap rubber defining the ground contacting surface and having a loss tangent δ1 of from 0.15 to 0.30, and a radially inner base rubber having a loss tangent δ2 of from 0.05 to 0.20 which is less than the loss tangent δ1.

8. The pneumatic tire according to claim 1, wherein the shoulder parts are provided with axial grooves each opening to one of the circumferential grooves and having an inclination angle θ of from 0 to 15 degrees with respect to the tire axial direction at said merge point.

9. The pneumatic tire according to claim 8, wherein a width of each axial groove at the groove top is in a range of from 0.009 to 0.018 times a tread width of the tread portion.

10. The pneumatic tire according to claim 1, wherein in a foot print of the tire, each of the circumferential grooves has an axially inner edge being substantially straight and an axially outer edge curved such that the width therebetween increases towards both the circumferential ends thereof.

* * * * *

UNITED STATES PATENT AND TRADEMARK OFFICE
CERTIFICATE OF CORRECTION

PATENT NO.     : 6,340,041 B1
DATED          : January 22, 2002
INVENTOR(S)    : Hideaki Sugihara and Koji Ohkita It is certified that error appears in the above-identified patent and that said Letters Patent is hereby corrected as shown below:

<u>Title page,</u>
Insert the following item:
-- [30]  Foreign Application Priority Data
December 11, 1998  [JP] Japan         10-353198
March 25, 1999     [JP] Japan         11-082245
November 25, 1999  [JP] Japan         11-334559 --

Signed and Sealed this

Twenty-third Day of March, 2004

JON W. DUDAS
*Acting Director of the United States Patent and Trademark Office*